United States Patent [19]

Rohardt

[11] Patent Number: 5,364,297
[45] Date of Patent: Nov. 15, 1994

[54] MOORING SYSTEM FOR THE STATIONARY POSITIONING OF MEASUREMENT DEVICES IN CURRENTS OF WATER

[75] Inventor: Gerd Rohardt, Hipstedt, Germany

[73] Assignee: Alfred-Wegener-Institut fur Polar- und Meeresforschung, Bremerhaven, Germany

[21] Appl. No.: 103,840

[22] Filed: Aug. 9, 1993

[30] Foreign Application Priority Data

Aug. 8, 1992 [DE] Germany .......................... 4226614

[51] Int. Cl.$^5$ .................................. B63B 22/18
[52] U.S. Cl. ............................... 441/23; 114/230
[58] Field of Search .................. 441/6, 21, 22, 23, 33; 114/243, 294, 230; 73/170.29, 170.05

[56] References Cited

U.S. PATENT DOCUMENTS

| | | |
|---|---|---|
| 3,077,614 | 2/1963 | Lloyd . |
| 3,423,777 | 1/1969 | Feyling . |
| 3,590,635 | 7/1971 | Duing .................. 441/23 X |
| 3,728,748 | 4/1973 | Roehler et al. .............. 441/23 |
| 3,935,592 | 1/1976 | Dahlen et al. .......... 73/170.29 X |

OTHER PUBLICATIONS

Nautilus Marine Service GmbH, New Deep Sea Instrument Moorings (sales brochure).
Ozeanografische Verankerungs Systeme, Fa. Hagenuk, Jun. 1975.
Vitrovex, Deep Sea Floatation, (sales brochure).

*Primary Examiner*—Sherman Basinger
*Attorney, Agent, or Firm*—Nils H. Ljungman & Associates

[57] ABSTRACT

A mooring system for the stationary positioning of measurement devices in currents of water typically has a mooring cable which is anchored to the bottom of the body of water and at least one buoyant device for holding the mooring cable vertically in the water. By combining the protective jacket of the buoyant device and the cable guide of the buoyant device into a common molding, no additional assembly parts are needed. The buoyant devices can also be directly attached to the mooring cable by appropriately protected threading slots.

15 Claims, 11 Drawing Sheets

MOORING SYSTEM FOR THE STATIONARY POSITIONING OF MEASUREMENT DEVICES IN CURRENTS OF WATER

BACKGROUND OF THE INVENTION

1. Field of the Invention

This invention relates to a mooring system for the stationary positioning to measurement devices in currents of water. Such a mooring system would generally have a mooring cable system anchored to a base anchoring device, and supporting the measurement devices. The cable system can utilize protectively-coated lifting bodies to keep the cables taut in relation to the base anchoring device. The lifting bodies can be connected to the cables by means of a cable guide so that the lifting bodies are free to rotate about the cable, and move with the mooring cable under different current flows.

2. Background Information

Such mooring systems as described above can be used in oceanography, for example, for anchoring a variety of measurement devices which can be used to record a variety of parameters of the ocean water. Some of the different types of measurements which can be taken are the measurement of individual physical values, such as the temperature and velocity of the water currents, and also measurements of the number of particles in the water to determine pollution, sand or plankton concentration. In carrying-out such measurements, continuous readings over long periods of the are important for long-term monitoring of the condition the water.

To obtain accurate, repeatable measurements from the measuring devices, it is important to keep the system of mooring cables, to which the measurement devices are connected, taut so that the cables and the measurement device do not incline significantly in the current. This can essentially only be achieved by providing the mooring cable with a corresponding buoyancy in the form of lifting bodies. The buoyancy provided for any cable system should generally take into consideration the weight of the measuring devices, as well as the flow resistance of all of the bodies attached to the cable system. The buoyancy provided for the cable systems should essentially be sufficient to neutralize the weight of the entire mooring cable system, including the measurement devices (net buoyancy).

The brochure "New Deep Sea Instruments Moorings", published by Nautilus Marine Service GmbH, Bremen, in 1991, discloses one arrangement for mooring instruments in water currents. The lifting bodies shown are hollow glass spheres with plastic shells as a protective covering, and the mooring system has special fastening blocks for connecting the lifting bodies to the mooring cable. With these special fastening blocks, the lifting bodies are connected to the mooring cable in a manner in which the lifting bodies are still free to rotate about, and move with, the mooring cable. The fastening blocks or "EDDYGRIP" attachments described by this brochure were also developed by the Alfred Wegener Institut, to which the present is assigned.

With the "EDDYGRIP" fastening blocks, the flow resistance of the lifting bodies can be reduced by their non-twisting rotation about the mooring cable in the lee current. In addition, the net buoyancy of the mooring system can be significantly improved by the elimination of additional chains or mounting frees in the mooring cable system for fastening the lifting bodies.

Such known fastening blocks generally consist of two halves which are screwed to one another by means of a screw connection. The plastic shells protecting the glass spheres are also connected to the fastening blocks in the screw connection on the one end of the respective fastening blocks, and the fastening blocks also provide an area for receiving a mooring cable on the other end thereof.

Although such an "on-the-cable" fastening method, wherein the blocks are disposed about the cable, has major advantages over the previously-used "in-the-cable" methods, wherein the fastening devices were directly incorporated into the cable, the connection by means of screws of the additional, buoyancy-reducing fastening blocks can tend to be relatively complex, time-consuming and expensive. Particularly, the process requires tools and naval bolts. Even the prefabrication of the cable segments which support several lifting bodies is not optimal, since the cable segments must usually be installed in the mooring cable system by means of additional heavy connecting elements. With such cable modules, moreover, both transport and handling on deck tend to become difficult and complex.

OBJECT OF THE INVENTION

On account of the enormously high costs of installation of known mooring apparatus, at the measurement site, it is an object of the present invention to develop a mooring system which is simple and also easy to remove and reinstall, with a limited use of personnel, material and mechanical equipment. It is also desirable that assembly times be minimal, and that the system provide ease of handling, and flexibility, in the selection of the number and location of lifting bodies.

SUMMARY OF TEE INVENTION

The present invention is in response to the technical, economic and logistical problems discussed immediately hereabove. The present invention is characterized by a mooring system wherein the cable guide and the protective jacket for the lifting body are preferably united directly in a common molding, and wherein the cable guide is preferably provided with a threading slot for threading the lifting bodies onto the mooring cable. The mooring cable can preferably be protected against slipping out of the cable guide, and the moldings, or lifting bodies, can essentially be directly installed onto the mooring cable at any desired point.

As a result of the integration of the cable guide into the protective jacket of the lifting body, additional fastening parts can essentially be eliminated, along with essentially all the working steps, tools and means generally required for assembly of the lifting bodies. The same is true to an even greater extent for the advantage of providing a simple attachment of the cable guide, and thus of the lifting body, to the mooring cable. The connection according to the present invention can be made easily by hand, without any assembly tools, by inserting the cable into the threading slot so that the cable is secured against slipping out. The cable preferably slides directly into the cable guide through the threading slot, and the cable can be removed from the cable guide simply by unthreading the cable from the cable guide back out through the threading slot. There is also essentially no need to use naval bolts to bolt each fastening block to the mooring cable, thereby eliminating potential weak points in the system. There is also apparently no reason to fear that the cable will become jammed in the guide as a result of screws which have been tightened excessively.

The cable guide can preferably withstand great stresses as a result of its structural integration into a single molding which also includes the protective jacket for the buoyant devices of the lifting bodies. Further, on account of the particular simplicity of the connection of the lifting bodies to the mooring cable, the connection can essentially be made quickly and typically by only a few personnel. Therefore the lifting elements can generally be attached directly on site during the installation of the mooring system. A number of lifting elements tailored to the weight of a measurement device can be positioned above the measurement device. The adjustment capability is sufficiently flexible that changes in weight of measuring devices installed on a mooring cable can be easily and immediately taken into consideration by changing the type, or number of lifting bodies installed on the cable.

Expensive and time-consuming pre-assembly and modifications of previously installed lifting elements are also essentially unnecessary with the devices of the present invention. The individual lifting bodies, which have no bulky and awkward fastening elements, are very easy to handle and stow. They can also be handled and stored in pre-assembled, modular form. Even the subsequent addition of lifting elements, under water and after the mooring cable has been laid, is possible. Further, since the elements can be attached at essentially any desired point along the mooring cable, the mooring cable essentially does not need to be modified or disassembled at any time, or in any way, to install additional lifting bodies thereon, or remove existing lifting bodies therefrom.

The present invention also makes possible the elimination of relatively complex slots which run all the way through the lifting bodies, for example, slots for cylindrical lifting bodies with a cable guide which runs along their central axis. Such complex slots can essentially be eliminated, if, in accordance with an advantageous configuration of the present invention, the integrated cable guide is essentially located on the outside of the molding. As such, the integrated cable guide can preferably be configured as at least one flange, which has a threading slot running diagonally to the longitudinal cable guide.

In order to ensure that the cable will remain in the cable guide, it is preferable that segments of the flange, along the flange length, be at the greatest possible axially-parallel distance from the axis of the cable guide. Or, in other words, it is preferable that the portion of the flange which provides the threading slot be disposed a distance from the cable guide and preferably offset to the cable guide so that when the cable is pulled taut within the cable guide, the cable will be held within the cable guide. The number and location of the flanges can thereby be a function of the geometric configuration of the protective covering of the individual lifting body. For example, a single flange could be appropriate for spherical jackets, while for longer lifting bodies, two or more relatively short flanges at some distance from one another can be used. Alternatively, even one long, continuous flange could be used.

When determining the path of the threading slot, it is preferable that the slot runs at a sufficient angle in relation to the axis of the cable guide so that the cable, once inserted and pulled taut, essentially cannot slip out again. If the threading slot runs diagonally only in one direction, the ends of the threading slot, or opening portions at the top and bottom thereof, should preferably be disposed at the greatest possible distance from the axis of the guide cable. If the slot changes directions diagonally, i.e. if the slot is sine-wave or zig-zag shaped, the amplitude of the path of the slot should preferably be large enough to extend a sufficient distance from the axis of the cable guide to insure that a taut cable would not be able to unthread itself during use.

Since the manufacture of such slots, such as a zig-zag slot or even a set of angled slots disposed one above the other, can be relatively complex, an additional configuration of the present invention provides that the integrated cable guide be formed by at least one flange which has a threading slot running in a linear fashion and parallel to the axis of the cable guide. Such a linear slot could then preferably be closed by means of a tube sleeve which can be disposed over the flange by means of a slot which corresponds to the width of the flange. Such a tube sleeve could then preferably be simply slipped over the flange to install the tube sleeve. The manufacture of such a linear slot can generally be relatively uncomplicated. It is thereby generally not important whether the tube sleeve closes several short slots or one long slot, as long as the sleeve keeps the mooring cable, once inserted, from unintentionally slipping out again.

Because the slot is essentially linear, the geometric path of such a linear slot along the axis of the cable guide, all by itself, is generally not sufficient to secure the cable once the cable has been inserted. For this reason, a securing means, such as a tube sleeve for being disposed the cable guide to close off the threading slot may be necessary. Such a tube sleeve can most easily also be slotted so that the slot of the tube sleeve preferably corresponds to the width of the flange, namely so that the unslotted part of the sleeve preferably closes the threading slot of the cable guide. Since the sleeve can preferably be slid onto and off of the flange, installation and removal of the sleeve can be easily done by-hand. Further, there is generally also no need for the sleeve to be clamped into place, as the sleeve can essentially be firmly seated by hand.

When the lifting body generally has only one long flange with a threading slot, it can be advantageous if preferably only one sleeve is necessary, which sleeve can preferably be guided securely because of its length. Because the sleeve essentially closes off the openable end of the molding forming the lifting body, such a sleeve also increases the stability of the molding, and in particular the stability of the cable guide.

An effective positioning stop can also be provided on the sleeve if desired to substantially ensure that the sleeve is installed correctly. Such a stop, in accordance with an additional configuration of the present invention, can be provided by a stop flange preferably disposed at the upper end of the tube sleeve. The tube sleeve could then be slid onto the flange up to the point at which the stop flange contacts the flange of the lifting body. The correct position of the sleeve on the molding in the vicinity of the cable guide is therefore essentially easy to find and verify.

The stop flange can also act as a stop for the lifting bodies on a stopper block fastened rigidly to the mooring cable, without thereby adversely affecting the freedom of rotation of the lifting bodies. The stopper block limits the displacement of the lifting bodies under buoyancy, and essentially provides a secure transmission of the buoyancy to the mooring cable to keep the cable taut once in place. When the mooring system is hauled up, the stopper blocks can preferably prevent excessive slipping of the individual lifting bodies, e.g. to protect the lifting bodies themselves or to protect the measurement devices. Such stopper blocks are already known from the mooring system described above with the "Eddygrip" (Nautilus brochure), and were also developed by the Alfred Wegener Institute.

Under the force of the buoyancy of the lifting bodies against the stop block on the cable, the lifting bodies essentially slide even more strongly against the stop flange of the tube sleeve, thereby essentially guaranteeing that the sleeve remains captive and that the mooring cable is protected from slipping out.

As noted above, the stop flange can be used to hold the molding in place under the action of its buoyancy. However, when the system is hauled up out of the water, the individual lifting bodies are primarily subjected to the force of gravity and may therefore slide out of the tube sleeve. Therefore, if the mooring system is going to be handled out of the water, a device can be provided for locking the sleeves in place. To prevent the molding from slipping out of the tube sleeve, which tube sleeve holds the molding, but does not clamp the molding in place, it can be favorable if, as in an additional advantageous configuration of the present invention, the tube sleeve can be fixed in its limit position with a suitable locking mechanism. One type of locking mechanism would be preferably be a safety pin in the vicinity of its lower end. It should generally be understood that such a safety pin, of course, is generally only required during the installation and retrieval of the mooring system, yet is not detrimental to the mooring system under water so can be left in place during use of the mooring system. The safety pin can, for example, preferably be a simple splint with a split end. Such a simple splint can generally be installed without tools, and can essentially be removed simply by squeezing or cutting off the spread end thereof. The splint would therefore typically not interfere with the attachment and removal of the lifting bodies.

Of particular importance for the stability of a mooring system is its net buoyancy, i.e. its actual buoyancy after subtracting its flow resistance. The buoyancy for a mooring system cannot simply be designed to be as great as possible, as this would result in extremely high flow resistance. It is therefore important to minimize the weight of a mooring system. A conceivably decisive fact is thereby the above-mentioned advantage of the mooring system proposed by the present invention, which results in extremely few additional connecting elements. If, in accordance with another aspect of the present invention, the molding with the integrated cable guide, the tube sleeve and the safety pin are each preferably made of a neutral-buoyancy materials, these elements can simply be discounted, or cancelled out, for calculation of the net buoyancy. In terms of the calculation of net buoyancy, therefore, the neutral buoyancy parts essentially can be considered as non-existent, which is particularly advantageous for very long mooring systems containing a rather large number of such elements. The buoyancy effect can be increased even further if the molding, tube sleeve and safety pin are made of a material which has a density of less than 1.

There are many different designs of lifting bodies which could potentially be modified in accordance with the present invention to combine the cable guide and the protective coating into a single molding. The lifting bodies can have a spherical jacket, as shown in U.S. Pat. No. 3,423,777, which issued in 1965, a cylindrical protective jacket, as shown in U.S. Pat. No. 3,077,614, which issued in 1960, or several small, cylindrical jackets layered one on top of the other as described by "Ozeanographische Verankerungssysteme" [Oceanographic Mooring Systems], Hagenuk, 1975, and have their cable guides in the interior of their protective jackets. Such lifting bodies are generally permanently filled with a porous foam which preferably incorporates a large volume of air.

In an additional advantageous configuration of the mooring system according to the present invention, the molding essentially can be formed to have two hemispheres which can be connected to one another so that they enclose a preferably spherical cavity. The hemispheres can preferably be held together by connecting the molded parts together in the vicinity of the cable guide by means of the tube sleeve which is pulled over the molded parts.

The brochure entitled "Deep Sea Glass Spheres" published by Benthos, Inc. (Data Sheet 204, 1979), discloses lifting bodies which are constructed of a vacuum glass sphere with a plastic jacket ("hardhat") consisting of two hemispheres. Such "hardhats", however, do not have an integrated cable guide, and are thus not moldings in the sense of the present invention. These "hardhats" require additional fastening elements, for example, the Eddygrip fastening elements, to connect the "hardhats" to the mooring cable.

With split protective jackets, such as those provided by the present invention, a simple visible inspection of the inside, e.g. of the glass sphere, can be possible. This can be made even easier by the fact that the hemispheres can be closed on the cable guide side exclusively by the tube sleeve which is simply pulled over them, thereby retaining all the advantages indicated above. The tube sleeve can preferably be configured to be tight enough to hold the hemispheres in place, while nevertheless also allowing penetration of water into the hemispheres to prevent the formation of cavities therein. The two hemispheres of the molding can preferably be opened slightly to allow for a visual inspection of the glass sphere, or other buoyant device disposed therein.

On the opposite side of the moldings, or the side opposite to the cable guide, the hemispheres can preferably be fastened together by any of several appropriate means. In this regard, the hemispheres could possibly be fastened together by means of screws or bolts, whereby the inspection of the buoyant device can be performed by slightly bending the flexible shells, without requiring the bolts or screws to be removed. The stationary side of the lifting bodies, or moldings, however, could also be formed by a simple hinge, which would preferably include parts of the moldings themselves or of additional elements. However, it is particularly advantageous if the hemispheres have at least one flange on their side opposite the cable guide, over which an additional correspondingly slotted tube sleeve can be pulled to fasten the two hemispheres together. Such a connection method would further reduce the number of connecting pieces required.

By preferably utilizing tube sleeves to connect the moldings together at both sides, the assembly of the lifting bodies is simplified, and essentially no additional tools are required. Further, the hemispheres can be completely separated from one another relatively easily to allow for a visual inspection of the buoyancy device, i.e. a glass sphere, contained therein, and to make the replacement of the buoyancy device, or glass sphere, a particularly fast and simple operation.

In a further preferred embodiment of the invention, the hemispheres can preferably also have alignment devices, at least in the vicinity of the cable guide, for accurate positioning of one of the hemisphere sections in relation to the other. Such an alignment device could preferably be a series of corresponding projections and recesses on corresponding halves of the molded sections, or could alternatively be pins, etc., on one section which fit into corresponding holes of the other section. The additional positive connection provided by such alignment devices can also preferably prevent the hemispheres from slipping during assembly and floating under the action of their own buoyancy. By providing alignment grooves right on the molded sections during the molding process, further additional components for fitting the two halves together are essentially not necessary.

It can also be particularly advantageous if, in accordance with the embodiment of the invention disclosed below, the molding halves are substantially identical components. The manufacture of the molding halves is thereby significantly simplified even further, as essentially only one mold would need to be made to produce both halves. Further, since identical parts would essentially always be connected to one another, essentially no preliminary sorting would be necessary to find two halves which fit together. The maintenance of an inventory of replacement parts is also simplified, as preferably only one part would be needed to replace any hemisphere section. The inventory and replacement of parts would be further simplified, in particular, if the flanges on both edges of the sections were also identical, thus, enabling one configuration of tube sleeve, instead of two, to be used for both edges of the lifting bodies. The manufacture of identical parts as mass-produced parts, with a correspondingly low cost of production, also has major advantages from an economic point of view.

In an additional configuration of the mooring system according to the present invention, the mooring cable system can preferably have a single, uninterrupted, continuous mooring cable. In other words, all the components in the "on-the-cable" method can preferably be connected about a single mooring cable. As such, there would essentially be no need for any integrated chains or frames, nor any prefabricated cable modules.

In addition, if all the parts required, including the measurement devices, were to be provided with a molding according to the present invention, (i.e. on their surface they have an integrated cable guide—generally in the form of a flange on the outside—and can easily be threaded onto the cable) the entire mooring system can be significantly simplified. The measuring devices could then preferably also be secured by pushing tube sleeves over them.

The attachment of flanged cable guides to existing measurement devices or other elements of a mooring system can generally be done easily and economically. If a vertical fastening of the measurement devices or of the other elements is desired, such a fastening can be done in the manner of the prior art by installing stopper blocks on the mooring cable.

With the system according to the present invention, the process of laying and retrieving the mooring system can be particularly simplified, because of the ease of attaching the lifting bodies and measurement devices. The number of different components required is essentially very small, and the cost of labor and material, as well as the molding time, can be kept to a minimum.

In summary, one aspect of the invention resides broadly in a mooring system for the stationary positioning of measurement devices in a body of water. The body of water has a surface and a bottom disposed a distance below the surface, and the mooring system comprises: an anchor device for anchoring the system in a substantially fixed position at the bottom of the body of water, a type of cable having a first end attached to the anchor device and a second end disposed opposite to the first end, a buoy device attached to the second end of the cable for maintaining the second end of the cable a distance above the first end of the cable towards the surface of the body of water, a device for attaching at least one measuring device to the cable, at least one additional buoyant body disposed on the cable at a position between the buoy device and the anchor device, and a device for inhibiting movement of the at least one additional buoyant body in a direction towards the second end of the cable. The buoy device and the at least one additional buoyant body are configured for maintaining the cable device taut between the first end and the second end of the cable device. The at least one additional buoyant body comprises: buoyant material and a cover device, with the cover device having an external surface, and the cover device comprising: a first portion for enclosing the buoyant material, and a second portion for being disposed about the cable means to retain the at least one buoyant body on the cable, the second portion having a first end for being disposed towards the buoy device, a second end opposite to the first end, the second end for being disposed towards the anchor means, and a length between the first end and the second end; the second portion having an opening therethrough for receiving the cable therein, the opening extending from the first end of the second portion to the second end of the second portion along the length of the second portion. The cover device further has a slot extending from the external surface to the opening in the second portion, the slot extending from the first end of the second portion to the second end of the second portion along the length of the second portion, and the slot being configured for threading the cable therethrough and into the opening of the second portion. The buoyant body further comprises apparatus for retaining the cable in the second portion of the cover device after the cable is threaded through the slot.

Another aspect of the invention reside broadly in a method for mooring at least one measuring instrument in a body of moving water with an instrument mooring system, the body of moving water having a surface and a bottom disposed a distance below the surface. The instrument mooring system comprises: an anchor device for anchoring the system in a substantially fixed position at the bottom of the body of water, a type of cable having a first end attached to the anchor device and a second end disposed opposite to the first end, a buoy device attached to the second end of the cable for maintaining the second end of the cable a distance above the first end of the cable towards the surface of the body of water, apparatus for attaching at least one measuring device to the cable, at least one additional buoyant body disposed on the cable at a position between the buoy device and the anchor device, and apparatus for inhibiting movement of the at least one buoyant body towards the second end of the cable. The buoy device and the at least one additional buoyant body are configured for maintaining the cable taut between the first end and the second end of the cable. The at least one additional buoyant body comprising: buoyant material and a cover device, with the cover device having an external surface, and the cover device comprising:The system further comprises apparatus for retaining the cable in the second portion of the cover device after the cable is threaded through the slot. The method comprises the steps of: providing the anchor device, attaching the first end of the cable to the anchor device, attaching the second end of the cable to the buoy device, attaching at least one measuring instrument to the cable device, attaching the apparatus for inhibiting movement of the at least one buoyant body to the cable, the apparatus for inhibiting movement having a first side disposed towards the anchor device, disposing the at least one additional buoyant body on the cable at a position adjacent the first side of the apparatus for inhibiting movement, the disposing comprising threading the cable through the slot into the second portion of the cover device; retaining the cable in the second portion of the cover device with the means for retaining, and depositing the system in the body of water.

A still further aspect of the invention resides broadly in a mooring system for the stationary positioning of measurement devices in a body of water, the body of water having a surface and a bottom disposed a distance below the surface. The mooring system comprises: an anchor device for anchoring the system in a substantially fixed position at the bottom of the body of water; a type of cable having a first end attached to the anchor device and a second end disposed opposite to the first end, at least one buoyant body disposed on the cable at least adjacent the second end of the cable, with the at least one buoyant body being configured for maintaining the cable taut between the first end of the cable and the at least one buoyant body. The at least one buoyant body comprises: buoyant material, and a cover device, the cover device having an external surface, and the cover device comprising: a first portion for enclosing the buoyant material, and a second portion for being disposed about the cable means to retain the at least one buoyant body on the cable, the second portion having a first end for being disposed towards said anchor means, a second end opposite to the first end, and a length between the first end and the second end; the second portion having an opening therethrough for receiving the cable therein, the opening extending from the first end of the second portion to the second end of the second portion along the length of the second portion. The cover device further has a slot extending from the external surface to the opening in the second portion, the slot extending from the first end of the second portion to the second end of the second portion along the length of the second portion, and the slot being configured for threading the cable therethrough and into the opening of the second portion. The system further comprises a apparatus for retaining the cable in the second portion of the cover device after the cable is threaded through the slot.

BRIEF DESCRIPTION OF THE DRAWINGS

The present invention is explained in greater detail below with reference to the accompanying figures which illustrate the mooring system according to the present invention. The figures schematically illustrate particularly preferred embodiments of the present invention, and some of the illustrations are drawn to different scales to make certain details more apparent. In the figures:

FIGS. 9c and 9d show possible configurations of the threading slot as viewed along line IX—IX of FIG. 9a.

DESCRIPTION OF THE PREFERRED EMBODIMENTS

Figure 1:
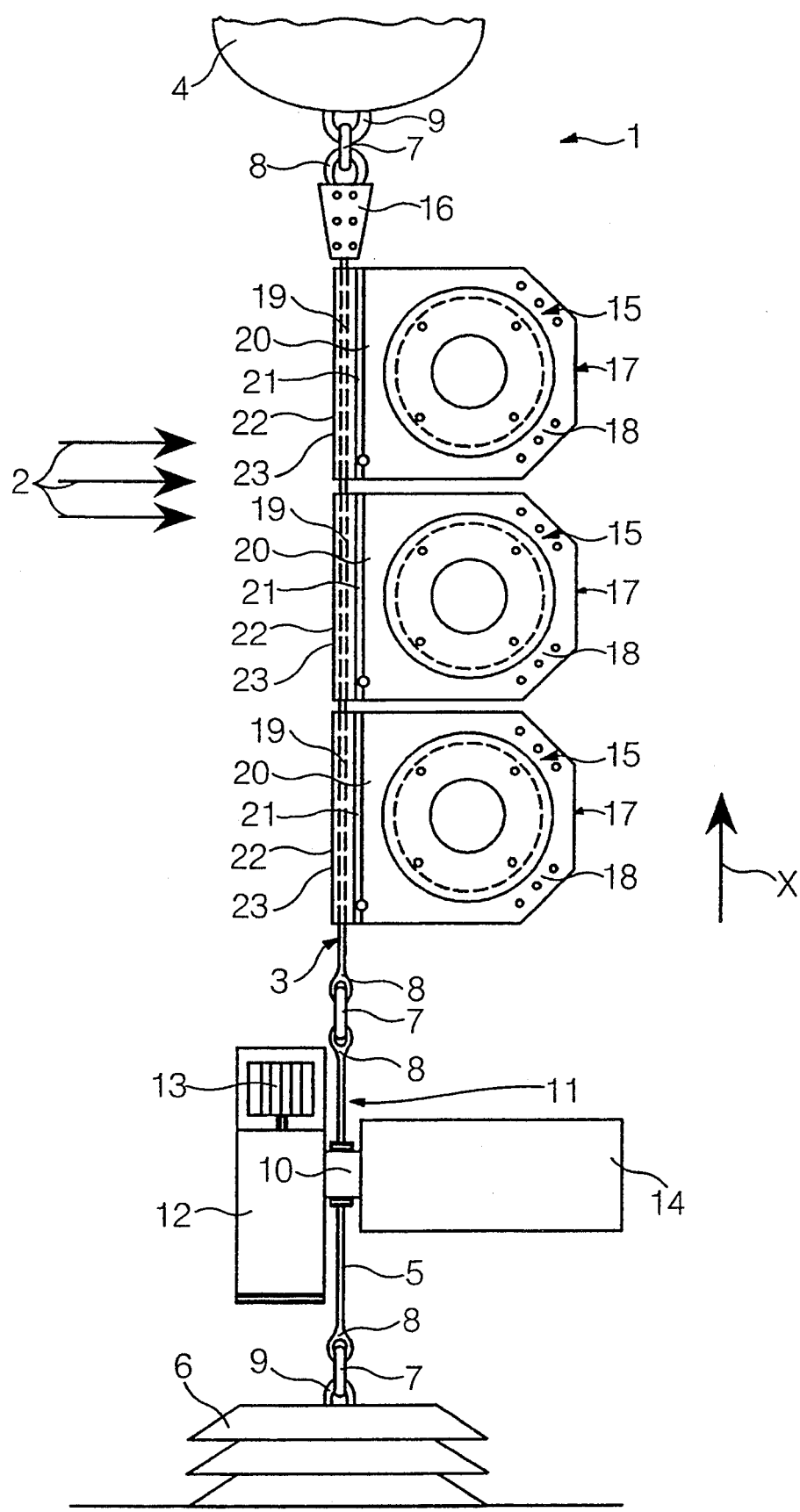
FIG. 1 shows a mooring system with lifting bodies according to the present invention.

A typical mooring system 1, according to the present invention, is illustrated in FIG. 1. When installed in water, the mooring system would generally be subjected to a current, as illustrated by 2. The mooring system 1 will generally have a mooring cable 3, which can preferably be made of a plastic. Such a cable 3 could be made of a braided Superaram fiber rope with a polyester cover, such as KING ROPE having a breaking force of up to 160 kN, or could be made of KEVLAR. On the upper end of the cable 3 a buoy 4 could preferably be fastened to the cable 3. On the lower end of the cable 3 a base weight 6 can preferably be fastened. It could also be advantageous to use a further rod 5 between the lower end of the cable 3 and the base weight 6, while a single continuous cable 3 could also be used.

The connections between the buoy 4, the cable 3, the rod 5, and the base weight 6 can preferably be made by means of shackles 7, which can be hooked into grommet thimbles 8, at the ends of the cable 3 or rod 5, and into rings 9 on the buoy 4 and the base weight 6. Between the buoy 4 and the base weight 6, the mooring cable system 3 can essentially be kept vertically taut in the current 2.

Whenever a rod 5 is used adjacent the weights 6, a measurement device 11 can preferably be fastened along the rod 5. Such a measuring device 11 could preferably be fastened by means of a stable pivot bearing 10, which could be located centrally along the rod 5. Alternatively, the measurement device 11 could be disposed about the cable 3.

A measurement device 11, such as that shown, can preferably have a housing 12, in which there is a measurement instrument, for example, a flowmeter 13. The measurement device 11 can preferably rotate in the direction of the current by means of a directional vane 14 disposed on the opposite side of the coupling 10, that is, disposed on a side of the cable 3 away from the measurement device 11.

In the vicinity of the upper end of the mooring cable system 3 there are shown three lifting bodies 15. However, as one working in the field would know, the number of lifting bodies present could be greater than three, or less than three depending on the buoyancy desired. These lifting bodies 15 are preferably pushed upward by buoyancy in the water, in the direction indicated by Arrow X. To position the lifting bodies along the cable 3, a stopper block 16 can preferably be fastened to the cable 3 at a position above the lifting bodies 15. The buoyancy of the lifting bodies 15 essentially push the lifting bodies 15 against the stopper block 16. The stopper block can preferably be positively connected to the mooring cable 3 and can transmit the lifting force to thereby pull the cable taut.

The lifting bodies 15 each preferably have a molding 17, which can be made of a neutral-buoyancy plastic. These moldings 17 can preferably be made of a plastic such as polyethylene. Each molding 17 can essentially be configured with a protective jacket 18 and a cable guide 19. The cable guide 19 is essentially indicated by dotted lines in FIG. 1.

The cable guide 19 is preferably located on the outside 20 of the molding 17 in a long flange 21. The cable guide 19, in essence can preferably be formed by an interior surface within the flange 21. The mooring cable 3 can be inserted, or threaded into the cable guide 19 through a threading slot 22 (shown in FIG. 3) which is essentially in the plane of the drawing in FIG. 1. This threading slot 22 can preferably be linear and disposed along the length of the flange 21. Although not clearly shown in FIG. 1, the threading slot 22 has been closed by pulling over it a tube sleeve 23. As discussed further below with reference to FIGS. 2 and 3, the tube sleeve 23 preferably has a slot which corresponds to the width of the flange 21. The sleeve can thereby protect the mooring cable 3 against slipping out of the threading slot 22.

Figure 2:
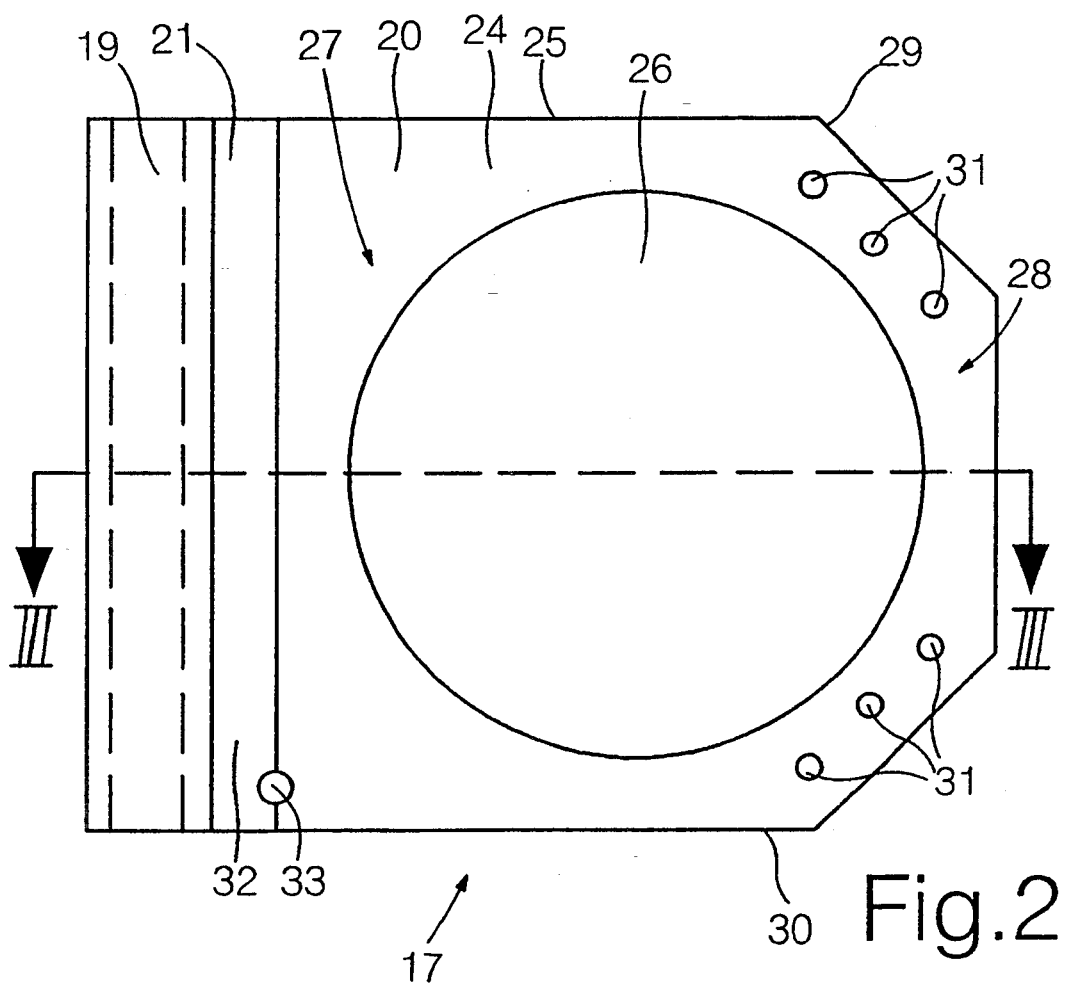
FIG. 2 shows a plan view of a lifting body molding as illustrated in FIG. 1.
Figure 3:
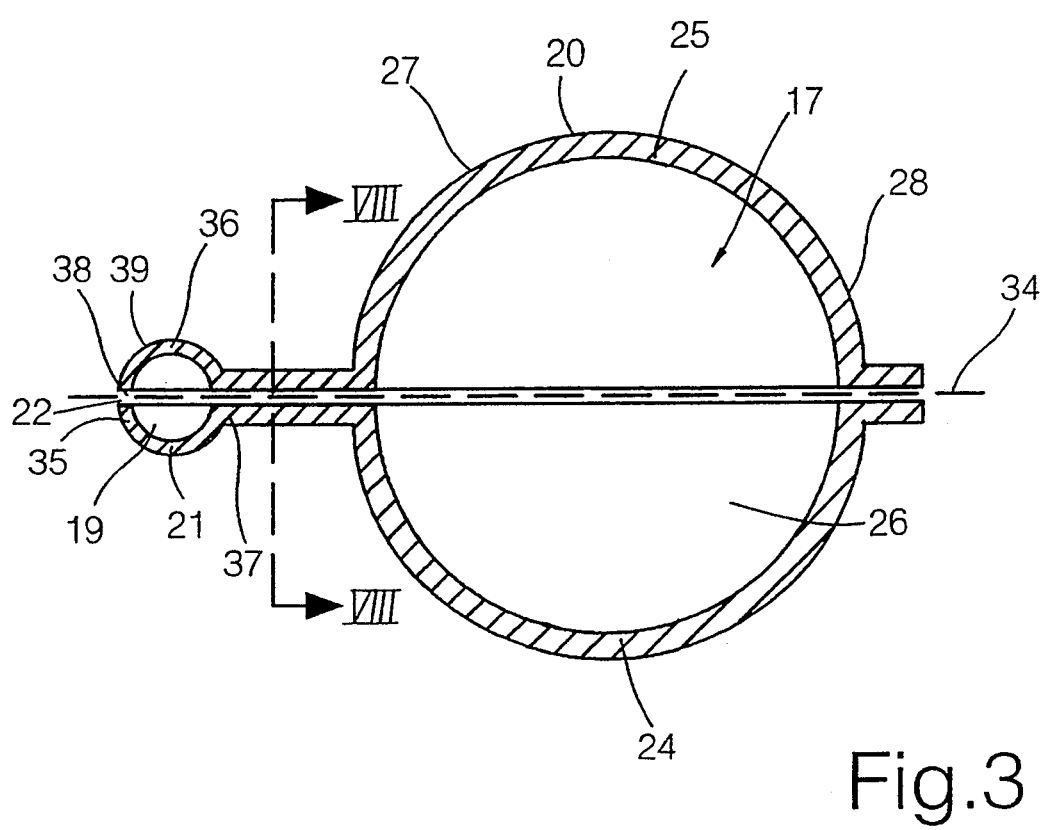
FIG. 3 shows a cross section of the molding of the lifting bodies taken along line III—III of FIG. 2.

FIG. 2 shows a plan view of the molding 17 of the lifting body 15 illustrated in FIG. 1, and FIG. 3 shows a cross section of the lifting body as taken along line III—III of FIG. 2. As shown, the molding 17 preferably has two plastic hemispheres 24 and 25, which are placed in contact with one another (in the plane of FIG. 2) and they in turn enclose a cavity 26. The cavity is preferably configured for receipt of a vacuum glass sphere, or essentially any other type of buoyant device. One type of buoyancy device which can be used with the moldings 17 is the VITROVEX glass sphere, which provides a buoyancy of about 26 dan per sphere in depths of up to about 6700 meters.

On the outside 20, along a side 27, the molding 17 preferably has the long flange 21, in which the cable guide 19 is preferably located in the form of a slot along the entire flange 21 (indicated in dotted lines in FIG. 2). On one side 28 opposite the cable guide 19, the molding 17 preferably has holes 31 adjacent each of its upper and lower beveled edges 29 and 30. The molding parts 17 can thereby preferably be fastened together by means of the holes 31, such as by bolts, etc. FIG. 2 essentially shows three holes 31 at each edge, but the number of holes present can be varied for particular circumstances depending on the amount of fastening needed. Other types of fastening means can essentially also be used for joining the hemispheres 24 and 25 together. For a positive connection of the two hemispheres 24 and 25, it can be sufficient under some circumstances if only the center-most holes of the sets of three holes 31 are provided with a bolted connection. As such, the hemispheres 24 and 25 can then be slightly spread apart, e.g. for purposes of inspection, as long as they are not connected to one another on the side 27. In a lower region 32 of the cable guide 19, the molding 17 can preferably have an additional hole 33 for purposes of securing the molding halves together, or as discussed further below, for securing the tube sleeve 23 in place.

As shown in greater detail in the cross section of the molding 17 as depicted in FIG. 3, the molding 17 is preferably in two parts, and its hemispheres 24, 25 are preferably in contact with one another along a joint plane 34.

On the outside 20, on the side 27 with the cable guide 19, the long flange 21 is also shown in cross section. The end of the long flange 21 which provides the cable guide is preferably rounded to conserve material and reduce weight, and preferably has two small semi-, or half-cylinders 35, 36, the insides of which form the cable guide 19 in the form of a long, round cavity. The semi-cylinders 35 and 36 are connected to the hemispheres 24, 25 by means of a web 37. FIG. 3 shows the combination of the cable guide 19, by means of the small semi-cylinders 35, 36 and the web 37, with the large hemispheres 24, 25 to form a common molding 17. A seam 38, which results from the fact that the molding 17 is in two parts, runs on an outer side 39 of the flange 21.

The seam 38 essentially forms the slot opening 22 through which the cable can be threaded. To insert the mooring cable 3 (not shown) into the cable guide 19, the hemispheres 24, 25 can be slightly spread apart on their side 28 opposite the cable guide 19. The seam 38 can thereby form the threading slot 22 which runs in a linear fashion and parallel to the cable guide 19. After the mooring cable 3 is introduced through the formed slot 22, the small hemispheres 35, 36 can again be joined along the seam 34.

In other words, a spreading apart of the hemispheres 35 and 36 along the seam 38 forms the slot 22 through which the cable 3 can be passed into the cable guide 19. Once the cable 3 is inserted, the hemispheres can be allowed to close together again to at least partially close off the opening 22.

With this arrangement, the cable is already protected to some degree from slipping out, as the slot 22 has essentially been minimized. Under a sufficient force, however, such as, a strong current pulling the molding 17 away from the cable 3, the slot 22 could possibly be opened and the cable could pass therethrough, causing the lifting device 15 to be released. Thus, this initial protection has essentially been found to be insufficient for actual use under strong current flows.

Figure 4:
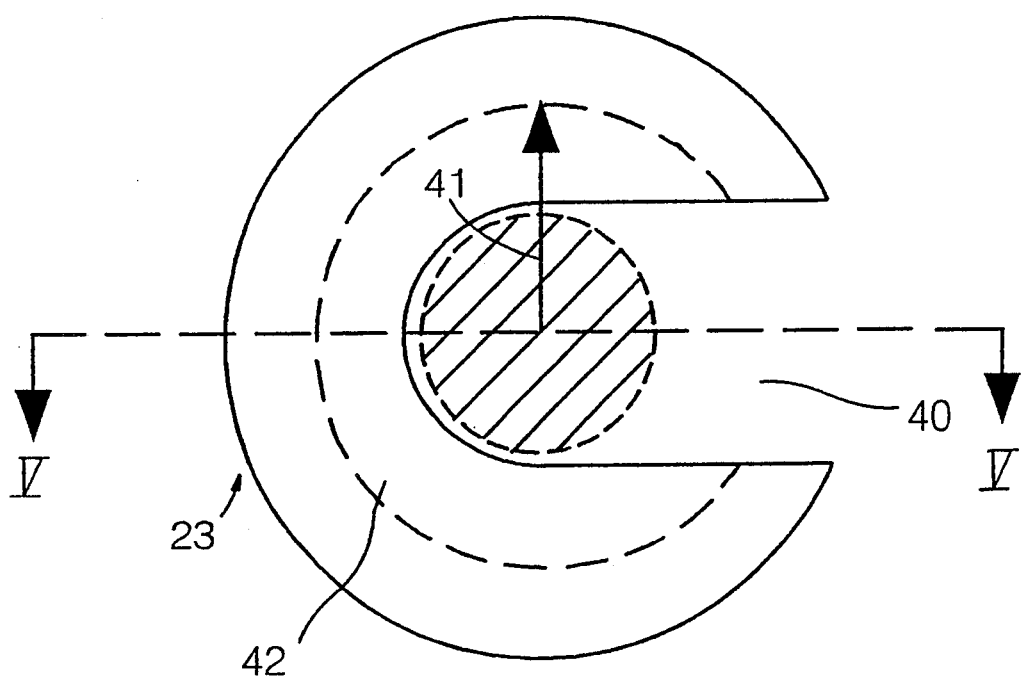
FIG. 4 shows an overhead view of a tube sleeve to be pulled over the molding illustrated in FIG. 1.

To reliably secure the mooring cable 3 in the cable guide 19, a tube sleeve 23 should preferably be used with the linear threading slot 22 as described above. FIG. 4 shows a plan view of the tube sleeve 23, wherein the parts not numbered can be identified on the basis of the numbers in the preceding figures. The tube sleeve 23 can preferably be made of a material RCH 1000, which has a neutral buoyancy.

In this regard, the tube sleeve 23 can essentially have a cylindrical shape with an inside radius 41. The inside radius 41 is preferably essentially the same as an outside radius of the cylindrical portion of flange 21, so that the tube sleeve 23 can be snugly positioned about the flange 21.

Figure 5:
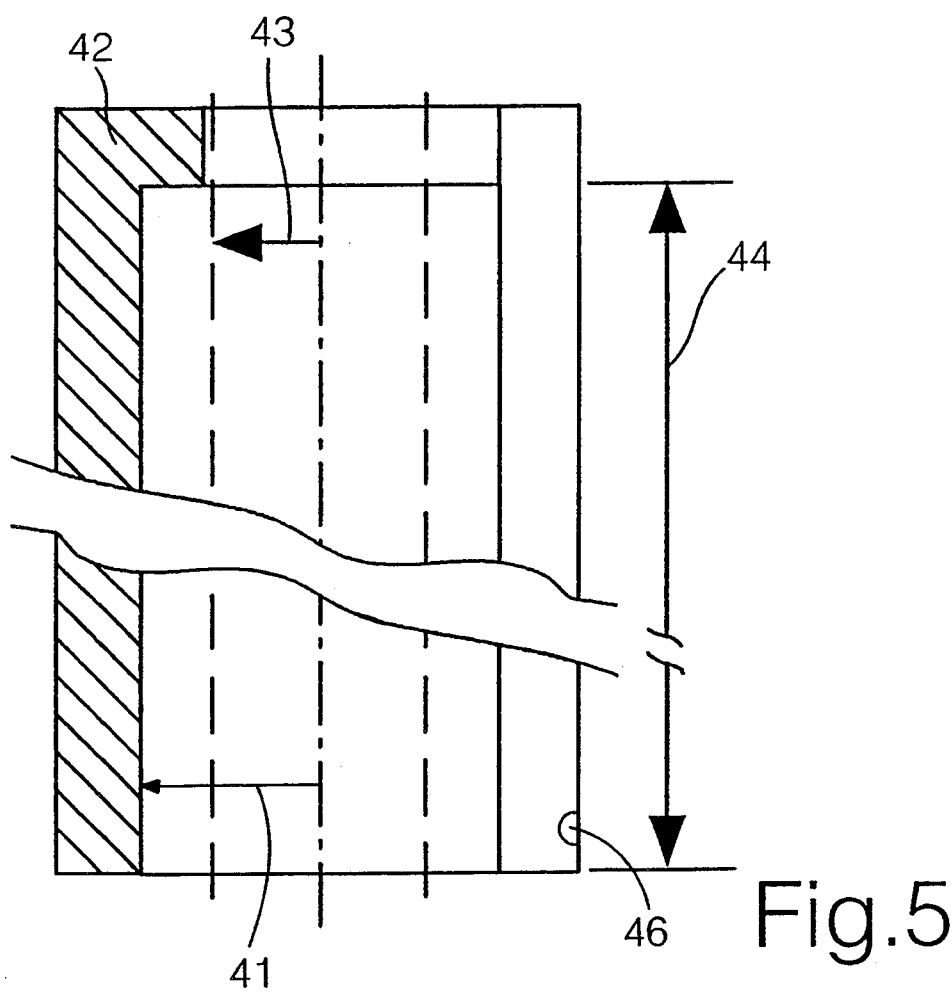
FIG. 5 shows a cross section of the tube sleeve taken along line V—V of FIG. 4.

The tube sleeve 23 preferably has a slot 40 so that the tube sleeve can be pulled over the web 37 of the molding 17 to thereby surround the outside 20 of the flange 21. To act as a stop against the molding 17, the tube sleeve 23 can preferably have a stop flange 42, which is illustrated in FIG. 5. FIG. 5 shows a cross section along Line V—V in FIG. 4. The stop flange 42 is essentially depicted by the dotted line in FIG. 4. The stop flange 42 essentially forms the upper limit of the tube sleeve 23.

The stop flange, in the particular embodiment shown, can have a thickness of approximately 20 mm, with a radius 43 which is approximately the same as the cable diameter (mooring cable 3 indicated in dotted lines). The length 44 of the tube sleeve 23 is determined as a function of the length of the flange 21, so that the tube sleeve 23 covers at least a substantial portion of the entire length of the flange 21 (the length 44 is shown interrupted in FIG. 5).

To insert the tube sleeve 23 over the flange 21, in the embodiment described above, the tube sleeve is preferably first placed above the molding 17 on the mooring cable 3, and then pushed, with the slot 40 over the flange 21 and the web 37 of the molding 17, until the tube sleeve comes to a stop at the stop flange 42. The assembly can essentially be disassembled in the reverse sequence.

Figure 6:
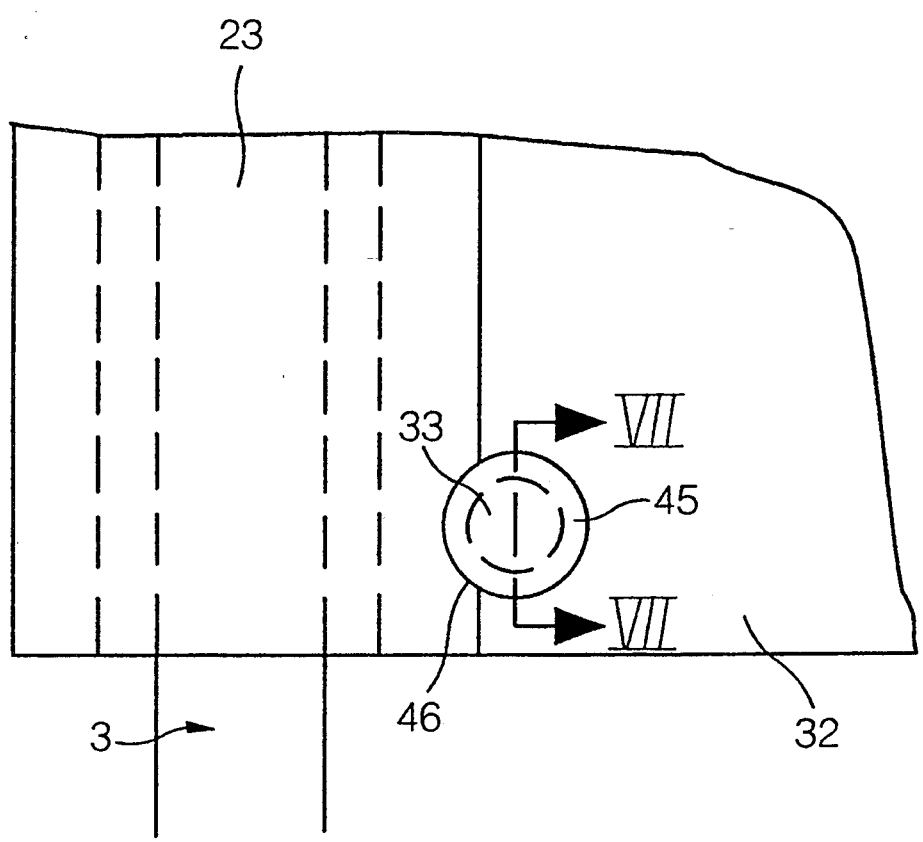
FIG. 6 shows an enlarged detail of the lifting body illustrated in FIG. 1, in the vicinity of the safety device.

As discussed briefly above, to secure the tube sleeve 23 against the effect of gravity when the mooring system is hauled out of the water, a safety mechanism, as illustrated in FIG. 6 may be necessary. The safety mechanism can be located in the lower portion 32 of the molding 17 and can essentially be the hole 33 (indicated by broken lines), into which a safety pin 45 (made of neutral buoyancy plastic) can be introduced. The tube sleeve 23 can have a routing 46 in which the safety pin 45 can be engaged to thereby preferably fix the sleeve 23 securely to the molding 17.

Figure 7:
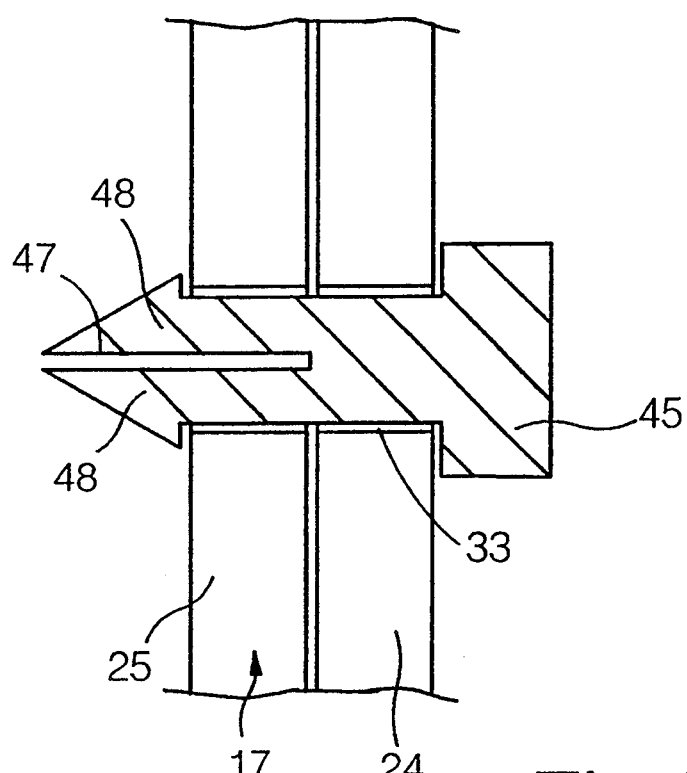
FIG. 7 shows a cross section through the safety device taken along line VII—VII of FIG. 6.

FIG. 7 shows a cross section of the safety pin 45 taken along line VII—VII in FIG. 6. The safety pin 45 preferably sits in the hole 33 and runs through the web 37 of both halves of the molding 17. On its end 46 the safety pin 45 can preferably have a slot 47 and projections 48. The projections 48 can preferably clamp the safety pin 45 in place when the safety pin 45 is inserted through hole 33. By pressing the projections 48 together, or into the slot 47, the safety pin 45 can essentially be removed without any additional tools. It is also possible to cut off the projections 48 for rapid disassembly.

Figure 8:
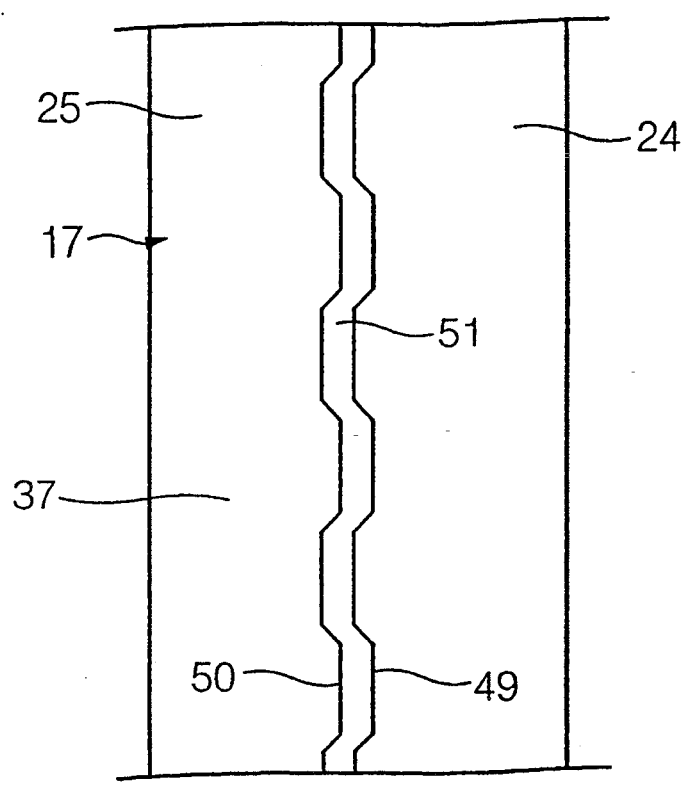
FIG. 8 shows a cross section of the molding of the lifting body taken along line VIII—VIII of FIG. 3, in the vicinity of the cable guide.

So that the hemispheres 24, 25 of the molding 17 do not slip when the tube sleeve 23 (not shown) is pulled over them, the hemispheres 24 and 25 can preferably be configured with a trapezoid-shaped alignment fitting 51 in the vicinity of the web 37 on the inner sides 49, 50. FIG. 8 shows a cross section of a portion of this alignment fitting 51 along line VIII—VIII in FIG. 3. Such an alignment fitting 51 can be relatively easy to make in plastic, since the entire molding 17 is preferably cast. Other types or shapes of alignment fittings are also possible, e.g. pins, triangles, squares, etc.

Figure 9A:
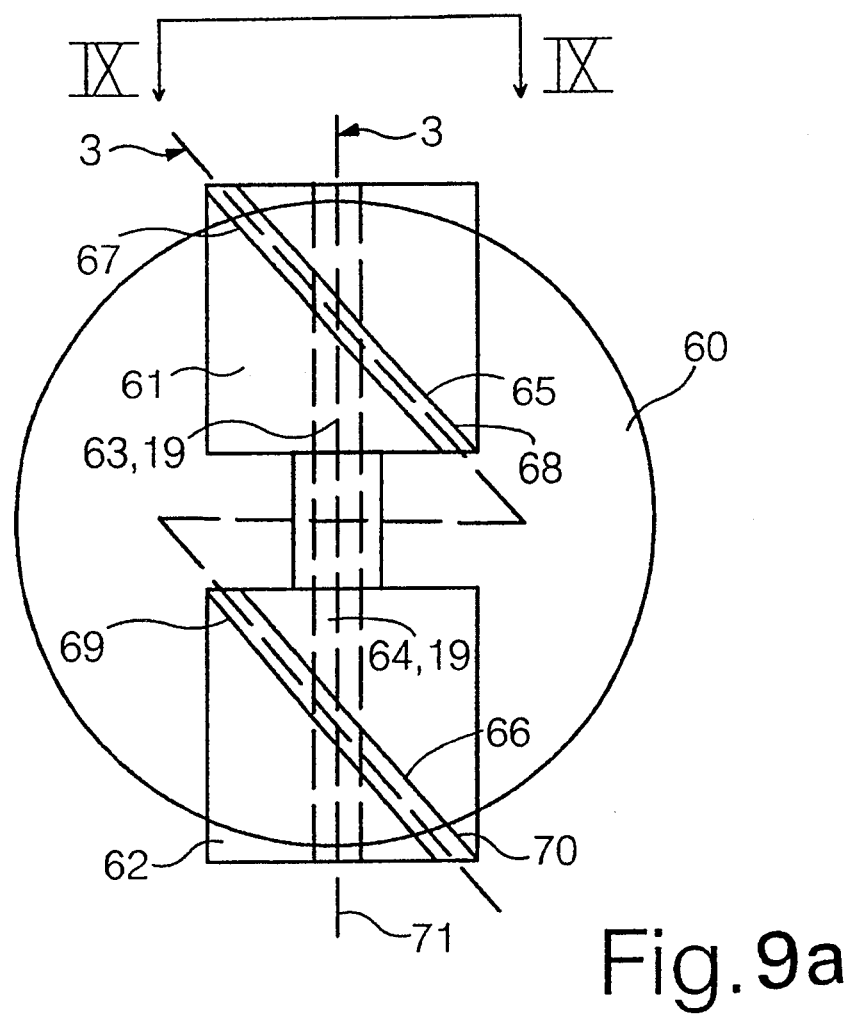
FIGS. 9a and 9b show additional mooring systems with lifting bodies according to the invention.
Figure 9B:
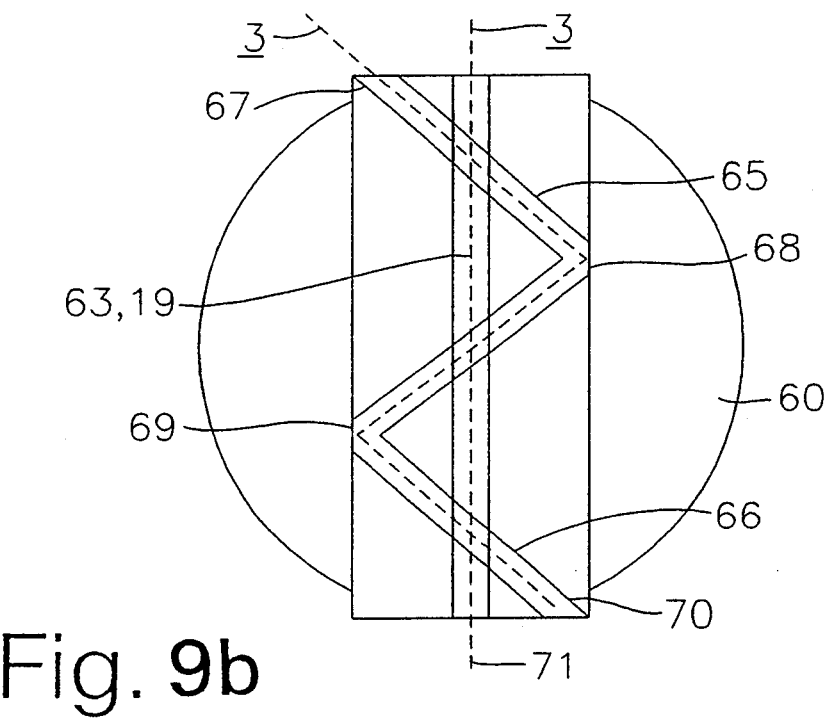

FIGS. 9a and 9b show other variants of the lifting body according to the present invention, in plan views from the side. A molding 60 can preferably have two flanges 61, 62, which are preferably spaced at some distance from one another. These flanges 61 and 62 essentially can provide the cable guide 19 by means of holes 63, 64. To introduce the mooring cable 3 into the cable guide, the flanges 61, 62 can preferably have diagonal threading slots 65, 66. As discussed previously, the threading slot could also be sinusoidal, or zig-zag as shown in FIG. 9b, etc. The introduction of the cable 3 into the slots 65 and 66 is shown in broken lines. After the cable is inserted through the threading slots 65 and 66, no additional securing of the mooring cable 3 is generally necessary, since the cable 3 can essentially no longer slip out because it is pulled taut. It is preferable, however, for the ends 67 to 70 to be at the greatest possible distance from the axis 71 of the cable guide. If the flanges were too small, wherein the ends 67 to 70 might not be positioned far enough from the axis 71, additional securing measures may be necessary.

Figure 9C:
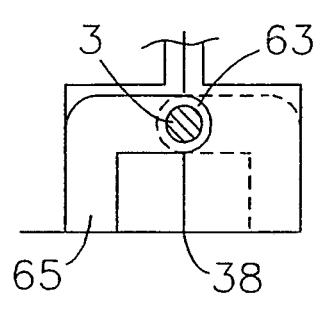
Figure 9D:
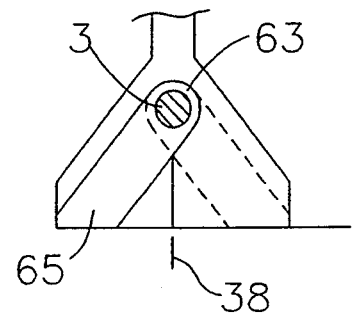

FIGS. 9c and 9d essentially depict alternate embodiments of the manner in which the threading slot could possibly be configured. In each of FIGS. 9c and 9d, the threading slot starts out at an angle with respect to the hole 63, and in FIG. 9c essentially remains angled to hole 63 until the slot is aligned with the hole 63 whereby the threading slot then opens out to form the hole 63. In FIG. 9d, the threading slot essentially starts out angled to the hole 63, and from there gradually tapers out into alignment with the hole 63. Other alternative embodiments of the threading slot would essentially also be possible.

Figure 10:
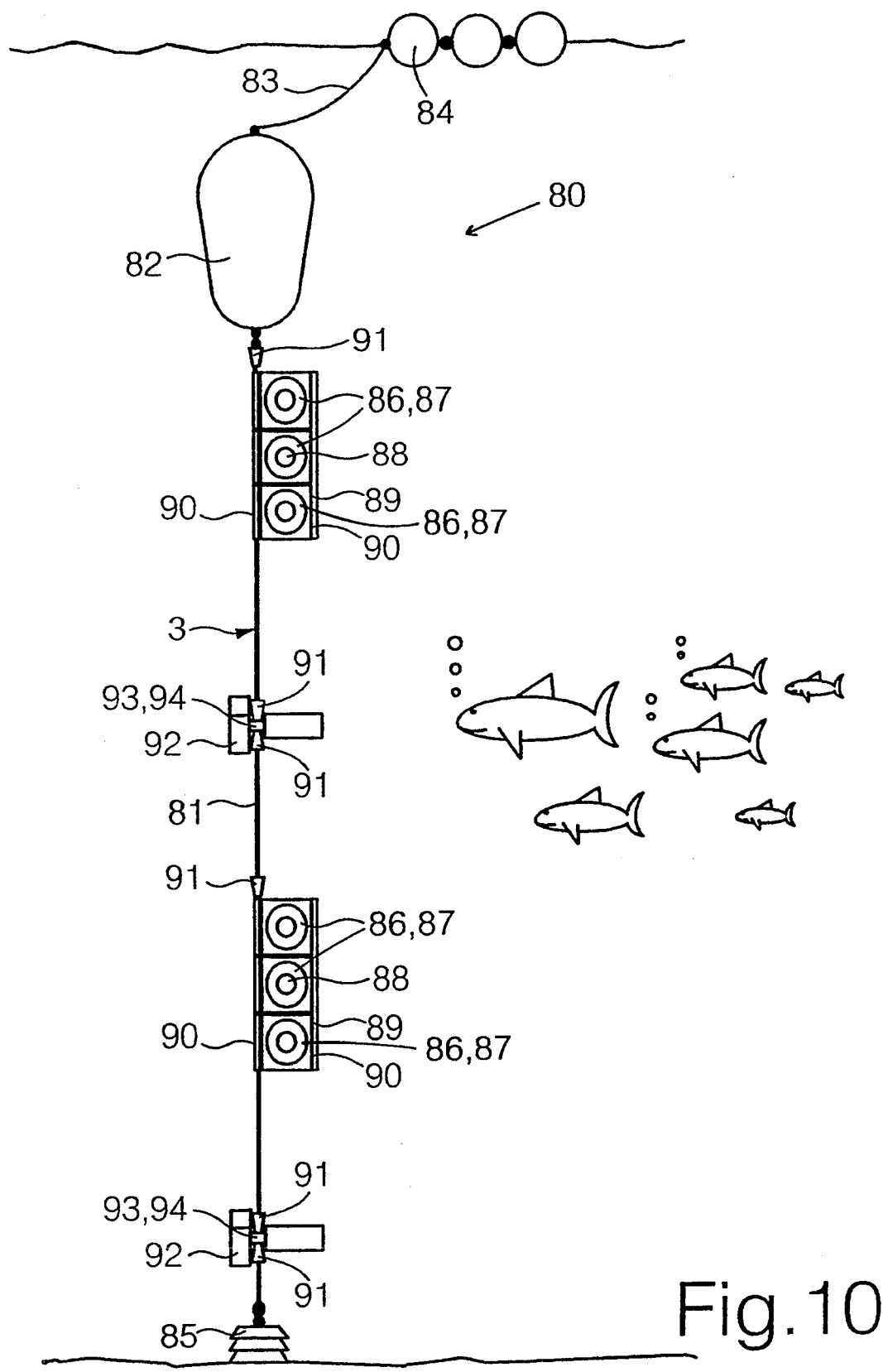
FIG. 10 shows a complete mooring system for deep sea use.

FIG. 10 shows a complete mooring system 80 for deep sea use. In this case, the mooring cable system 3 essentially consists of a single, continuous and uninterrupted mooring cable 81. The assembly of such a system 80 is particularly simple, since all the intermediate elements for the integration of cable segments, chains, rods and frames are eliminated. The single mooring cable 81 is held between a buoy 82, which is connected by means of a line 83 with floats 84, and a base weight 85. To keep the cable taut there are lifting bodies 86, which have moldings 87 preferably consisting of two hemispheres 88, which are completely symmetrical and identical in design.

Both on the cable side 81 and on the side 89 opposite the cable, the pairs of hemispheres 88 are preferably connected to one another by means of tube sleeves 90. The buoyancy is preferably transmitted by means of stopper blocks 91. Below the lifting bodies 86, measurement devices 92 can also be connected to the mooring cable 81 using the "on-the-cable" method. For that purpose, the measuring devices can preferably have cable guides 93 and safety mechanisms 94 of the types described earlier with regard to FIG. 1. It is generally necessary to provide two stopper blocks 91, one on each side of the measuring device 92 to maintain a position of the measuring device 92, along the cable 81.

The fast and easy assembly and disassembly of a complete mooring system as disclosed by the invention can result in a major reduction in cost, since it can save labor and material. It can also reduce the molding time, and can minimize the stowage space required on very expensive research vessels with their highly specialized crews and equipment.

One feature of the invention resides broadly in the system for the stationary positioning of measurement devices in currents of water, with a system of mooring cables holding the measurement devices and with protectively-covered lifting bodies to keep the cable taut in relation to a base point, which lifting bodies are connected by means of a cable guide to the mooring cable so that they can move and rotate freely, characterized by the fact that the cable guide 19, 93 is combined directly with the protective jacket 18 for the lifting bodies 15, 86 in a common molding 17, 60, 87, and has a threading slot 22, 65, 66 in which the mooring cable 3, 81 is secured against slipping, for the direct attachment of the molding 17, 60, 87 to the mooring cable 3, 81 at any desired point.

Another feature of the invention resides broadly in the mooring system, characterized by the fact that the integrated cable guide 19, 93 is located on the outside 20 of the molding 17, 60, 87.

Yet another feature of the invention resides broadly in the mooring system, characterized by the fact that the integrated cable guide 19 consists of at least one flange 61, 62 which has a diagonal threading slot 65, 66, in which segments 67–70 along its length are at the greatest possible axially parallel distance from the axis of the cable guide 71.

Still another feature of the invention resides broadly in the mooring system, characterized by the fact that the integrated cable guide 19, 93 consists of at least one flange 21, which has a threading slot 22 running in a linear fashion and parallel to the cable guide axis and which can be closed by means of a tube sleeve 23, 90 which can be pulled over it, and has a slot which corresponds to the width of the flange.

Yet still another feature of the invention resides broadly in the mooring system, characterized by the fact that the tube sleeve 23, 90 has a stop flange 42 on its upper end, up to which it can be pulled over the molding 17, 87.

Another feature of the invention resides broadly in the mooring cable system, characterized by the fact that the tube sleeve 23, 90 can be fixed in its limit position by means of a safety pin 45 in the vicinity 32 of its lower end on the molding 17, 87.

Still another feature of the invention resides broadly in the mooring cable system, characterized by the fact that the molding 17, 87 with the integrated cable guide 19, 93, the tube sleeve 23, 90 and the safety pin 45 are made of a neutral buoyancy material.

Still yet another feature of the invention resides broadly in the mooring system, characterized by the fact that the molding 17, 87 consists of two hemispheres 24, 25, 88 which can be connected to one another to enclose a cavity 26, whereby on their one side 27 in the vicinity of the cable guide 19, 93, they are connected to one another only by the tube sleeve 23, 90 pulled over them.

Another feature of the invention resides broadly in the mooring system, characterized by the fact that the hemispheres 88 on their side 89 opposite the cable guide 93 have at least one flange, over which a tube sleeve 90 slotted to fit the flange width can be pulled to fix the two hemispheres 88 to one another.

Still another feature of the invention resides broadly in the mooring system, characterized by the fact that the hemispheres 24, 25, 88 have alignment grooves 51, at least in the vicinity of the cable guide 19, 93, for correct positioning.

Yet another feature of the invention resides broadly in the mooring system, characterized by the fact that the hemispheres 88 are identical components.

Still yet another feature of the invention resides broadly in the mooring system, characterized by the fact that the mooring cable system 80 consists only of a single, uninterrupted and continuous mooring cable 81.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

| Nomenclature | |
|---|---|
| X | Arrow - direction of buoyancy |
| 1 | Mooring system |
| 2 | Current |
| 3 | Mooring system |
| 4 | Buoy |
| 5 | Rod |
| 6 | Base weight |
| 7 | Shackle |
| 8 | Cable grommet |
| 9 | Ring |
| 10 | Pivot bearing |
| 11 | Measurement device |
| 12 | Housing |
| 13 | Flowmeter |
| 14 | Directional vane |
| 15 | Lifting body |
| 16 | Stopper block |
| 17 | Molding |
| 18 | Protective jacket |
| 19 | Cable guide |
| 20 | Outside of 17 |
| 21 | Long flange |
| 22 | Threading slot |
| 23 | Tube sleeve |
| 24 | One plastic hemisphere |
| 25 | Other plastic hemisphere |
| 26 | Cavity |
| 27 | One side of 17 |
| 28 | Other side of 17 |
| 29 | Upper edge of 17 |
| 30 | Lower edge of 17 |
| 31 | Hole |
| 32 | Lower portion of 19 |
| 33 | Additional hole |
| 34 | Joint plane |
| 35 | One small hemisphere |
| 36 | Other small hemisphere |
| 37 | Web |
| 38 | Seam |
| 39 | Outside of 21 |
| 40 | Slot |
| 41 | Inside radius of 23 |
| 42 | Stop flange |
| 43 | Radius of 42 |
| 44 | Length of 23 |
| 45 | Safety pin |
| 46 | Routing of 23 |
| 47 | Slot of 45 |
| 48 | Projection of 45 |
| 49 | Inside of 24 |
| 50 | Inside of 25 |
| 51 | Alignment groove |
| 60 | Molding |
| 61 | One flange |
| 62 | Other flange |
| 63 | Hole |
| 64 | Hole |
| 65 | Threading slot of 61 |

-continued

| | Nomenclature |
|---|---|
| 66 | Threading slot of 62 |
| 67 | Upper end of 65 |
| 68 | Lower end of 65 |
| 69 | Upper end of 66 |
| 70 | Lower end of 66 |
| 71 | Cable guide axis |
| 80 | Mooring system |
| 81 | Mooring cable |
| 82 | Buoy |
| 83 | Line |
| 84 | Float |
| 85 | Base weight |
| 86 | Lifting body |
| 87 | Molding |
| 88 | Hemisphere |
| 89 | Other side of 88 |
| 90 | Tube sleeve |
| 91 | Stopper block |
| 92 | Measurement device |
| 93 | Cable guide |
| 94 | Safety mechanism |

What is claimed is:

1. A mooring system for the stationary positioning of measurement devices in a body of water, the body of water having a surface and a bottom disposed a distance below the surface, said mooring system comprising:

anchor means for anchoring said system in a substantially fixed position at the bottom of the body of water;

cable means, said cable means having a first end attached to said anchor means and a second end disposed opposite to the first end;

buoy means attached to the second end of said cable means for maintaining the second end of said cable means a distance above the first end of said cable means towards the surface of the body of water;

means for attaching at least one measuring device to said cable means;

at least one additional buoyant body disposed on said cable means at a position between said buoy means and said anchor means;

means for inhibiting movement of said at least one buoyant body in a direction towards the second end of said cable means;

said buoy means and said at least one additional buoyant body being configured for maintaining said cable means taut between the first end and the second end of said cable means;

said at least one additional buoyant body comprising:
buoyant material; and
cover means, said cover means having an external surface, and said cover means comprising:
a first portion for enclosing the buoyant material; and
a second portion for being disposed about said cable means to retain said at least one buoyant body on said cable means, said second portion having a first end for being disposed towards said buoy means, a second end opposite to said first end, said second end for being disposed towards said anchor means, and a length between said first end and said second end;

said second portion having an opening therethrough for receiving said cable means therein, said opening extending from said first end of said second portion to said second end of said second portion along the length of said second portion;

said cover means having slot means extending from said external surface to said opening in said second portion, said slot means extending from said first end of said second portion to said second end of said second portion along the length of said second portion, and said slot means being configured for threading said cable means through said slot means and into said opening of said second portion; and first sleeve means configured for being disposed about said second portion of said cover means to close said slot means for retaining said cable means in said opening of said second portion after said cable means is threaded through said slot means.

2. The mooring system according to claim 1, wherein:

said second portion of said cover means comprises a cylindrical portion, said opening of said second portion of said cover means comprises a cylindrical recess for receipt of said cable means therein;

said cylindrical portion being freely rotatable about said cable means when said cable means is in said cylindrical recess;

said cylindrical recess having a longitudinal axis;

said slot means comprises a substantially linear slot disposed parallel to the longitudinal axis of said cylindrical recess; and said first sleeve means comprises cylindrical sleeve means for being disposed about said cylindrical portion to close said substantially linear slot.

3. The mooring system according to claim 2, wherein:

said cover means comprises an integral molding of said first portion and said second portion;

said cover means has a first end and a second end, the second end being disposed opposite to the first end;

said first portion of said cover means being disposed adjacent the first end of said cover means;

said cover means comprises flange means extending from said first portion of said cover means, said flange means having a first end disposed adjacent said first portion of said cover means, and a second end disposed opposite to the first end;

said flange means comprises said second portion of said cover means at the second end of said flange means, said second portion of said cover means being disposed spaced apart from said first portion of said cover means; and said second portion of said cover means comprises the second end of said cover means.

4. The mooring system according to claim 3, wherein:

said flange means comprises web means connecting said first portion of said cover means to said second portion of said cover means, said web means having a length extending from said first portion of said cover means to said second portion of said cover means, and a width disposed in a direction perpendicular to the length;

said first sleeve means comprises a tubular sleeve, said tubular sleeve defining a longitudinal axis;

said tubular sleeve has a slot disposed parallel to the longitudinal axis of said tubular sleeve, said slot being configured for receiving said web means therein;

said tubular sleeve having a first end and a second end, said first end being substantially open;

said cylindrical portion being slidably disposable within said tubular sleeve through said first end of said tubular sleeve; and said second end of said tubular sleeve comprising a stop flange for contacting said cylindrical portion upon insertion of said cylindrical portion into said tubular sleeve to limit movement of said cylindrical portion into said tubular sleeve.

5. The mooring system according to claim 4, wherein:

said cover means further comprises means for locking said tubular sleeve onto said cylindrical portion, said means for locking comprising:
a hole in said web means; and
pin means, said pin means having a first portion for being disposed through the hole and a second portion for contacting said tubular sleeve; and
said cover means, said tubular sleeve and said pin means comprise neutral-buoyancy material.

6. The mooring system according to claim 5, wherein:

said cover means comprises a first part and a second part, said first part and said second part for being joined together to form said tubular cylinder and to form said cover means first portion of for enclosing the buoyant material;
each of said first part and said second part of said cover means comprising an integrally molded one-piece part comprising a recessed hemispherical portion, a web portion, and a recessed half-tubular portion for respectively forming a spherical recess in said first portion of said cover means, said web means and said cylindrical portion upon said first part and said second part being joined together; and
said first part and said second part of said cover means comprising substantially identical half-parts of said cover means.

7. The mooring system according to claim 6, wherein:

said buoyant material comprises a sealed glass sphere containing air, said sealed glass sphere for being disposed in said spherical recess;
said first part and said second part are configured to be held together by said tubular sleeve at said second end of said cover means;
said first part and said second part each comprise a planar portion disposed about and extending away from said hemispherical recessed portions;
said planar portions form second flange means at said first end of said cover means;
said second flange means of each of said first part and said second part being configured to be fastened together by at least one of:
bolt means disposed through said flange means, and
second sleeve means for being disposed about said second flange means for holding said second flange means of said first part in contact with said second flange means of said second part;
said second sleeve means being substantially identical to said first sleeve means;
said planar portion of each of said first part and said second part have a surface for being disposed in contact with the surface of the other of said first part and said second part;
said surfaces for contacting comprising corresponding projections and recesses for aligning said first part with said second part;

said mooring cable consists of a single, uninterrupted cable extending from said buoy means to said anchor means;
said anchor means comprises weights for being disposed on the bottom of the body of water;
said system further comprises coupling means for coupling said cable means to said anchor means and said buoy means, said coupling means comprising:
a cable grommet disposed at each of said first end and said second end of said cable;
a ring attached to each of said buoy means and said anchor means; and
a shackle disposed through the cable grommet and the ring to connect the cable grommet to the ring;
said means for inhibiting movement of said at least one additional buoyant body comprises a stopper block fixedly connected to said cable means;
said cable means has an outer diameter, said cylindrical recess has an inner diameter, and said inner diameter of said cylindrical recess, the width of said slot in said tubular sleeve, and the outer diameter of said cable means being substantially equal;
said cylindrical portion has an outside diameter, said tubular sleeve has an inside diameter, and said outside diameter of said cylindrical portion and said inside diameter of said tubular sleeve being substantially equal;
said first portion of said locking pin defines a longitudinal axis, and said first portion of said locking pin comprises:
a terminal part for passing through the hole, the terminal part having at least one projection extending radially away from the longitudinal axis; and
a central part for being disposed within the hole;
said hole having an inside diameter, said central part of said first portion of said locking pin having an outside diameter, and said terminal part of said first portion of said locking pin having a dimension at said first projection;
said inside diameter of the hole and said outside diameter of said central part of said first portion of said locking pin being substantially equal, and said dimension of said terminal part being greater than said inside diameter of the hole;
at least a portion of the central part and the terminal part comprising first and second arm parts disposed in a spaced apart relationship from one another in a direction along said longitudinal axis of said first portion of said locking pin;
said first arm part and said second arm part being deformable to reduce the dimension of said terminal part to insert and remove the locking pin in the hole;
said cover means comprises polyethylene;
said cable means comprises a KEVLAR cable; and
the glass spheres comprises VITROVEX spheres.

8. A method for mooring at least one measuring instrument in a body of moving water with an instrument mooring system, the body of moving water having a surface and a bottom disposed a distance below the surface, said instrument mooring system comprising: anchor means for anchoring said system in a substantially fixed position at the bottom of the body of water; cable means having a first end attached to said anchor means and a second end disposed opposite to the first end; buoy means attached to the second end of said cable means for maintaining the second end of said cable means a distance above the first end of said cable means towards the surface of the body of water; means for attaching at least one measuring device to said cable means; at least one additional buoyant body disposed on said cable means at a position between said buoy means and said anchor means; means for inhibiting movement of said at least one buoyant body towards the second end of said cable means; said buoy means and said at least one additional buoyant body being configured for maintaining said cable means taut between the first end and the second end of said cable means; said at least one additional buoyant body comprising: buoyant material; and cover means, said cover means having an external surface, and said cover means comprising: a first portion for enclosing the buoyant material; and a second portion for being disposed about said cable means to retain said at least one buoyant body on said cable means; said second portion having a first end for being disposed towards said buoy means, a second end opposite to said first end, said second end for being disposed towards said anchor means, and a length between said first end and said second end; said second portion having an opening therethrough for receiving said cable means therein, said opening extending from said first end of said second portion to said second end of said second portion along the length of said second portion; said cover means having slot means extending from said external surface to said opening in said second portion, said slot means extending from said first end of said second portion to said second end of said second portion along the length of said second portion, and said slot means being configured for threading said cable means through the slot means and into said opening of said second portion; means for retaining said cable means in said second portion of said cover means after said cable means is threaded through said slot means, and said means for retaining comprising first sleeve means for being disposed about said second portion of said cover means to close said slot means, said method comprising the steps of:

provide the anchor means;

attaching the first end of said cable means to said anchor means;

attaching the second end of said cable means to said buoy means;

attaching at least one measuring instrument to said cable means;

attaching said means for inhibiting movement of said at least one buoyant body to said cable means, said means for inhibiting movement having a first side disposed towards said anchor means;

disposing said at least one additional buoyant body on said cable means at a position adjacent said first side of said means for inhibiting movement, said disposing comprising laterally threading said cable means through said slot means into said second portion of said cover means;

disposing said sleeve means about said second portion of said cover means to close said slot means and retain said cable means in said second portion of said cover means; and depositing said system in the body of water.

9. The method according to claim 8, wherein: said second portion of said cover means comprises a cylindrical portion, said cylindrical portion comprising a cylindrical recess therein for receipt of said cable means, said cylindrical portion being freely rotatable about said cable means when said cable means is in said cylindrical recess, said cylindrical recess having a longitudinal axis, said slot means comprises a substantially linear slot disposed parallel to the longitudinal axis of said cylindrical recess, said first sleeve means comprises first cylindrical sleeve means for being disposed about said cylindrical portion to close said substantially linear slot, and said method further comprises the steps of:

configuring said cylindrical portion, said cylindrical recess and said cable means such that said cylindrical portion is freely rotatable about said cable means when said cable means is in said cylindrical recess, and threading said cable means through said substantially linear slot of said cylindrical portion into said cylindrical recess within said cylindrical portion; and disposing said cylindrical sleeve means about said cylindrical portion to close said slot means and retain said cable means in said cylindrical portion.

10. The method according to claim 9, wherein said cover means has a first end and a second end, the second end being disposed opposite to the first end, and said method further comprises the steps of:

configuring said first portion of said cover means to be disposed adjacent the first end of said cover means;

providing flange means extending from said first portion of said cover means;

configuring said flange means to have a first end disposed adjacent said first portion of said cover means, and a second end disposed opposite to the first end;

providing said second portion of said cover means at the second end of said flange means and spaced apart from said first portion of said cover means; and providing said second portion of said cover means at the second end of said cover means.

11. The method according to claim 10, wherein said flange means comprises web means connecting said first portion of said cover means to said second portion of said cover means, said web means having a width, and said first sleeve means comprises a tubular sleeve, said tubular sleeve defining a longitudinal axis and said method further comprises:

providing a slot in said tubular sleeve in a direction parallel to the longitudinal axis of said tubular sleeve, said slot being configured for receiving said web means therein and said tubular sleeve having a first end and a second end, said first end being substantially open, said second end of said tubular sleeve comprising a stop flange for contacting said cylindrical portion upon insertion of said cylindrical portion into said tubular sleeve to limit movement of said cylindrical portion into said tubular sleeve;

slidably disposing said cylindrical portion within said tubular sleeve through said first end of said tubular sleeve until said stop flange contacts said cylindrical portion and limits further movement of said cylindrical portion into said tubular sleeve.

12. The method according to claim 11, wherein said cover means further comprises means for locking said tubular sleeve onto said cylindrical portion, said means for locking comprising: a hole in said web means; and pin means, said pin means having a first portion for being disposed through the hole and a second portion for contacting said tubular sleeve, and said method further comprises the steps of:

after sliding said cylindrical portion of said cover means into said tubular sleeve, inserting said pin through said hole to contact said second portion of said pin means with said tubular sleeve and lock said tubular sleeve onto said cover means; and forming said cover means, said tubular sleeve and said pin means from a neutral buoyancy material.

13. The method according to claim 12, wherein said cover means comprises a first part and a second part, said first part being substantially identical to said second part, said first part and said second part for being joined together to form said tubular cylinder and to form said cover means first portion for enclosing the buoyant material, each of said first part and said second part comprising a recessed hemispherical portion, a web portion, and a half-tubular portion for respectively forming a spherical recess, said web means and said cylindrical portion upon said first part and said second part being joined together, and said buoyant material comprises a sealed glass sphere containing air, said sealed glass sphere for being disposed in said spherical recess; and said method further comprises the steps of:

integrally molding said recessed hemispherical portion, said web portion, and said half-tubular portion to form each of said first part and said second part;

placing the sealed glass sphere in a recessed hemispherical portion of one of said first and second parts;

disposing the recessed portion of the other of the first and second parts over the sealed glass sphere to thereby form said cylindrical portion, said web means and said spherical recess; and joining together said first part and said second part to form said at least one additional buoyant body.

14. The method according to claim 13, further including:

holding said first part and said second part together at said second end of said cover means by disposing said tubular sleeve about said cylindrical portion;

configuring said first part and said second part to comprise a planar portion disposed about and extending away from said hemispherical recessed portions;

configuring said planar portions as a second flange means at said first end of said cover means;

fastening together said first part and said second part at said first end of said cover means by one of:
 disposing bolt means through said second flange means, and
 sliding second sleeve means about said second flange means to hold said second flange means of said first part in contact with said second flange means of said second part;

configuring said second sleeve means substantially identically to said first sleeve means;

configuring said planar portion of each of said first part and said second part with a surface for being disposed in contact with the surface of the other of said first part and said second part;

configuring said surfaces for contacting with corresponding projections and recesses for aligning said first part with said second part;

configuring said cable means as a single, uninterrupted cable extending from said buoy means to said anchor means;

configuring said anchor means as weights for being disposed on the bottom of the body of water;

providing coupling means for coupling said cable means to said anchor means and to said buoy means, said coupling means comprising:
 a cable grommet disposed at each of said first end and said second end of said cable;
 a ring attached to each of said buoy means and said anchor means; and
 a shackle disposed through the cable grommet and the ring to connect the cable grommet to the ring;

configuring said means for inhibiting movement of said at least one additional buoyant body as a stopper block for being fixedly attached to said cable means;

fixedly attaching said stopper block to said cable means at a position between said at least one buoyant body and said second end of said cable means;

configuring said first portion of said locking pin to comprise:
 a longitudinal axis;
 a terminal part for passing through the hole, the terminal part having at least one projection extending radially away from the longitudinal axis; and
 a central part for being disposed within the hole;
 said hole having an inside diameter, said central part of said first portion of said locking pin having an outside diameter, and said terminal part of said first portion of said locking pin having a dimension at said first projection;
 said inside diameter of the hole and said outside diameter of said central part of said first portion of said locking pin being substantially equal, and said dimension of said terminal part being greater than said inside diameter of the hole;
 at least a portion of the central part and the terminal part comprising first and second, arm parts disposed in a spaced apart relationship from one another in a direction along said longitudinal axis of said first portion of said locking pin;
 said first arm part and said second arm part being deformable from a rest configuration towards one another to reduce the dimension of said terminal part to insert and remove said locking pin into and from the hole;

deforming at least one of said first arm part and said second arm part towards the other of said first and second arm parts to reduce the dimension of said terminal part;

inserting said locking pin into the hole to dispose said terminal part through the hole;

releasing said at least one of said first arm part and said second arm part to return to the rest configuration to lock said locking pin into the hole;

forming said cable means from KEVLAR; and providing VITROVEX glass spheres as the buoyant material.

15. A mooring system for the stationary positioning of measurement devices in a body of water, the body of water having a surface and a bottom disposed a distance below the surface, said mooring system comprising:

anchor means for anchoring said system in a substantially fixed position at the bottom of the body of water;

cable means, said cable means having a first end attached to said anchor means and a second end disposed opposite to the first end;

buoy means attached to the second end of said cable means for maintaining the second end of said cable means a distance above the first end of said cable means towards the surface of the body of water;

means for attaching at least one measuring device to said cable means;

at least one additional buoyant body disposed on said cable means at a position between said buoy means and said anchor means;

means for inhibiting movement of said at least one buoyant body in a direction towards the second end of said cable means;

said buoy means and said at least one additional buoyant body being configured for maintaining said cable means taut between the first end and the second end of said cable means;

said at least one additional buoyant body comprising:
buoyant material; and
cover means;

said cover means having an external surface, and said cover means comprising:
a first portion for enclosing the buoyant material; and
a second portion for being disposed about said cable means to retain said at least one buoyant body on said cable means, said second portion having a first end for being disposed towards said buoy means, a second end opposite to said first end, said second end for being disposed towards said anchor means, and a length between said first end and said second end;

said second portion having an opening therethrough for receiving said cable means therein, said opening extending from said first end of said second portion to said second end of said second portion along the length of said second portion;

said cover means having slot means extending from said external surface to said opening in said second portion, said slot means extending from said first end of said second portion to said second end of said second portion along the length of said second portion, and said slot means being configured for threading said cable means through the slot means and into said opening of said second portion;

means for retaining said cable means in said opening of said second portion after said cable means is threaded through said slot means;

said cover means has a first end and a second end, the second end being disposed opposite to the first end;

said first portion of said cover means being disposed adjacent the first end of said cover means;

said cover means comprises flange means extending from said first portion of said cover means, said flange means having a first end disposed adjacent said first portion of said cover means, and a second end disposed opposite to the first end;

said flange means comprises said second portion of said cover means at the second end of said flange means, said second portion of said cover means being disposed spaced apart from said first portion of said cover means;

said second portion of said cover means comprises the second end of said cover means;

said second portion of said cover means comprises a cylindrical portion disposed at the second end of said flange means, said opening of said second portion of said cover means comprises a cylindrical recess for receipt of said cable means therein;

said cylindrical portion being freely rotatable about said cable means when said cable means is in said cylindrical recess;

said cylindrical recess having a longitudinal axis;

said slot means comprises a linear slot disposed parallel to the longitudinal axis of said cylindrical recess; and said means for retaining comprises first sleeve means for being disposed about said cylindrical portion to close said linear slot.

* * * * *